US010266138B2

(12) United States Patent
 Parker (10) Patent No.: US 10,266,138 B2
(45) Date of Patent: Apr. 23, 2019

(54) FASCIA PROTECTION MATERIAL AND METHOD OF FORMING AND APPLYING

(71) Applicant: The ELP Group LLC, Longboat Key, FL (US)

(72) Inventor: M. Lawrence Parker, Longboat Key, FL (US)

(73) Assignee: The ELP Group, LLC, Longboat Key, FL (US)

( * ) Notice: Subject to any disclaimer, the term of this patent is extended or adjusted under 35 U.S.C. 154(b) by 0 days.

(21) Appl. No.: 15/678,247

(22) Filed: Aug. 16, 2017

(65) Prior Publication Data

US 2018/0050647 A1 Feb. 22, 2018

Related U.S. Application Data

(60) Provisional application No. 62/375,784, filed on Aug. 16, 2016.

(51) Int. Cl.
| | | |
|---|---|---|
| *B60R 19/44* | (2006.01) | |
| *B62D 35/02* | (2006.01) | |
| *B60R 19/18* | (2006.01) | |
| *B62D 25/20* | (2006.01) | |

(52) U.S. Cl.
CPC ........ *B60R 19/445* (2013.01); *B62D 25/2009* (2013.01); *B62D 35/02* (2013.01); *B60R 2019/1886* (2013.01); *Y02T 10/82* (2013.01); *Y02T 10/88* (2013.01)

(58) Field of Classification Search
CPC .......... B60R 19/445; B60R 2019/1886; B62D 29/041; B62D 35/02; B60J 11/06
USPC ...... 293/126–128; 296/39.1, 136.02, 136.07, 296/136.08
See application file for complete search history.

(56) References Cited

U.S. PATENT DOCUMENTS

| | | | | |
|---|---|---|---|---|
| 5,158,324 A | * | 10/1992 | Flesher | B60J 11/06 280/770 |
| 5,725,712 A | * | 3/1998 | Spain | B05D 1/286 156/230 |
| 5,820,201 A | * | 10/1998 | Jabalee | B60J 11/00 296/136.02 |
| 6,183,580 B1 | * | 2/2001 | Harrell | B32B 15/08 150/166 |
| 9,186,972 B1 | * | 11/2015 | Holeman | B60R 19/44 |
| 2003/0099790 A1 | * | 5/2003 | Dey | B32B 27/08 428/31 |
| 2004/0124661 A1 | * | 7/2004 | Gentile | B60R 19/44 296/136.08 |
| 2007/0046059 A1 | * | 3/2007 | Shepherd | B60R 13/0861 296/39.1 |
| 2007/0114816 A1 | * | 5/2007 | Hoelzel | B32B 5/28 296/204 |

(Continued)

*Primary Examiner* — Gregory A Blankenship
(74) *Attorney, Agent, or Firm* — The Watson IP Law Group, PLC; Jovan N. Jovanovic (57) ABSTRACT

A fascia protection assembly comprising a fascia protection sheet member and a plurality of fasteners to couple the fascia protection sheet member to a vehicle. The fascia protection sheet member may be formed from a roll of material wherein a quantity of the roll is unrolled and cut to form an initial fascia protection sheet member. The cut portion can be further be trimmed to form a custom sized fascia protection sheet member. The fascia protection sheet member can be attached to the vehicle through fasteners of different types.

18 Claims, 7 Drawing Sheets

(56) References Cited

U.S. PATENT DOCUMENTS

| | | | | |
|---|---|---|---|---|
| 2008/0217947 | A1* | 9/2008 | Merryman | B60R 13/0815 |
| | | | | 296/39.1 |
| 2009/0071582 | A1* | 3/2009 | Durjan | B60J 11/06 |
| | | | | 150/166 |
| 2010/0078124 | A1* | 4/2010 | Nickolaus, Jr. | B29C 63/024 |
| | | | | 156/249 |
| 2012/0153643 | A1* | 6/2012 | Mana | B60R 19/12 |
| | | | | 293/120 |
| 2015/0183365 | A1* | 7/2015 | Aboughanem | B60J 11/06 |
| | | | | 362/520 |
| 2015/0329153 | A1* | 11/2015 | Oohashi | B62D 35/02 |
| | | | | 296/180.1 |
| 2016/0129940 | A1* | 5/2016 | Patberg | B62D 35/02 |
| | | | | 296/187.08 |
| 2017/0050682 | A1* | 2/2017 | Baudry | B60R 13/0861 |
| 2017/0349124 | A1* | 12/2017 | Onishi | B60R 21/34 |
| 2018/0050647 | A1* | 2/2018 | Parker | B60R 19/445 |
| 2018/0057069 | A1* | 3/2018 | Kayadere | B21D 53/88 |
| 2018/0215328 | A1* | 8/2018 | Sweder | B29C 51/105 |

\* cited by examiner

FASCIA PROTECTION MATERIAL AND METHOD OF FORMING AND APPLYING

CROSS-REFERENCE TO RELATED APPLICATION

This application claims priority from U.S. Pat. App. Ser. No. 62/375,784 filed Aug. 16, 2016, entitled Fascia Protection Material and Method of Applying, the entirety of the specification of which is hereby incorporated by reference.

BACKGROUND OF THE DISCLOSURE

1. Field of the Disclosure

The disclosure relates in general to vehicle protection assemblies, and more particularly, to a fascia protection material and method of applying the fascia protection material to the underside of a vehicle.

2. Background Art

It is common that new cars have polymer front bumpers with a lower fascia forming a portion of the bumper or of the lower portion of the vehicle. With newer vehicles, it is often the case that these fascia members extend rather low to improve appearance and aerodynamics.

Problematically, many curbs, parking stops and blocks, and other structures in parking lots have sufficient height so as to interfere or engage such fascia members. In many instances, the fascia member can ride over the structure when the car is parked, then when reversed over the structure, the lip of the fascia member engages the structure and the fascia member can, at best be marred, or, worse, cracked or destroyed.

Additionally, and problematically, different cars have different front end configurations, with different dimensions, different topographies and different structures therearound. As such, it is difficult if not impossible to have a single fascia member that can be applied to different vehicles across an entire line of vehicles serviced or otherwise maintained. Having a multitude of different fascia protectors in an inventory or the like is likewise not appealing and often not practical.

SUMMARY OF THE DISCLOSURE

The disclosure is directed to a fascia protection assembly comprising a fascia protection sheet member and a plurality of fasteners to couple the fascia protection sheet member to a vehicle. The fascia protection sheet member may be formed from a roll of material wherein a quantity of the roll is unrolled and cut to form an initial fascia protection sheet member. The cut portion can the further be trimmed to form a custom sized fascia protection sheet member. The fascia protection sheet member can be attached to the vehicle through fasteners of different types.

It is contemplated that the fascia protection assembly can be formed from a number of different polymers, such as an ABS plastic or the like. Other materials are contemplated. It is further contemplated that among other fasteners, existing fasteners on the vehicle are contemplated for use, as are fasteners that can be extended to existing structures on the vehicle.

Advantageously, the structure is not limited to any particular type of vehicle, or to any particular fascia type, but can be formed and trimmed to match the area desired for application in a number of different vehicles and constructions of such components. The use of the assembly is universal across a number of different vehicles.

Ain another aspect of the disclosure, the disclosure is directed to a method of applying fascia protection onto a vehicle comprising the steps of: providing a roll of fascia protection material; unrolling a desired amount of fascia protection material; cutting the desired amount of fascia protection material from the roll to form a fascia protection sheet member, with the fascia protection sheet member having a perimeter; applying the fascia protection sheet member onto a vehicle; and attaching the fascia protection sheet member to the vehicle.

In some configurations, the fascia protection sheet member is further trimmed after being cut from the roll.

In some configurations, the roll of fascia protection material comprises a polymer material.

In some configurations, the polymer material comprises an ABS plastic.

In some configurations, the roll of fascia protection material comprises a roll that has a length of between 20 feet and 100 feet.

In some configurations, the roll of fascia protection material comprises a roll that has a thickness of between 0.05" and 0.375".

In some configurations, the roll of fascia protection material comprises a roll that has a width of between 12" and 36".

In some configurations, the method further comprises the steps of: applying a finish to the perimeter of the fascia protection sheet member. In some configurations, the step of applying further comprises one of the steps of: bevel cutting the outer perimeter; smoothing out the outer perimeter; and folding the outer perimeter over itself.

In some configurations, the fascia protection sheet member further includes at least one of a topography that is other than planar, a plurality of strengthening ribs and a plurality of openings therethrough. Indeed, the method may comprise the step of forming one of a topography feature and an opening after or before the step of cutting.

In some configurations, the step of attaching further comprises the step of applying a plurality of fasteners to the vehicle and to the fascia protection sheet member to attach one to the other.

In some configurations, the step of attaching further comprises the step of directing a threaded fastener through the fascia protection sheet member and into the vehicle to capture the fascia protection member between the fastener and the vehicle.

In some configurations, the threaded fastener comprises a self tapping screw.

In some configurations, the step of attaching further comprises the step of directing a plurality of threaded fasteners through the fascia protection sheet member, at least a plurality of the plurality of threaded fasteners positioned about the perimeter.

In another aspect of the disclosure, the disclosure is directed to a fascia protection assembly comprising, in a kit form, a sheet member and a plurality of fasteners. The sheet member has an inner surface, an outer surface and a perimeter. The sheet member being rolled up into a roll of fascia material, wherein the sheet material is larger than is necessary for application onto a vehicle so that the perimeter can be formed after providing of the roll of fascia material. The plurality of fasteners structurally configured for coupling the sheet member to the vehicle.

In some configurations, the sheet material has a plurality of openings formed therethrough, structurally configured to receive a plurality of fasteners therethrough.

In some configurations, the plurality of fasteners comprises threaded fasteners.

In some configurations, the perimeter is formed by cutting at least a portion of the roll of fascia material.

In some configurations, the sheet member and the plurality of fasteners are provided as a kit.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
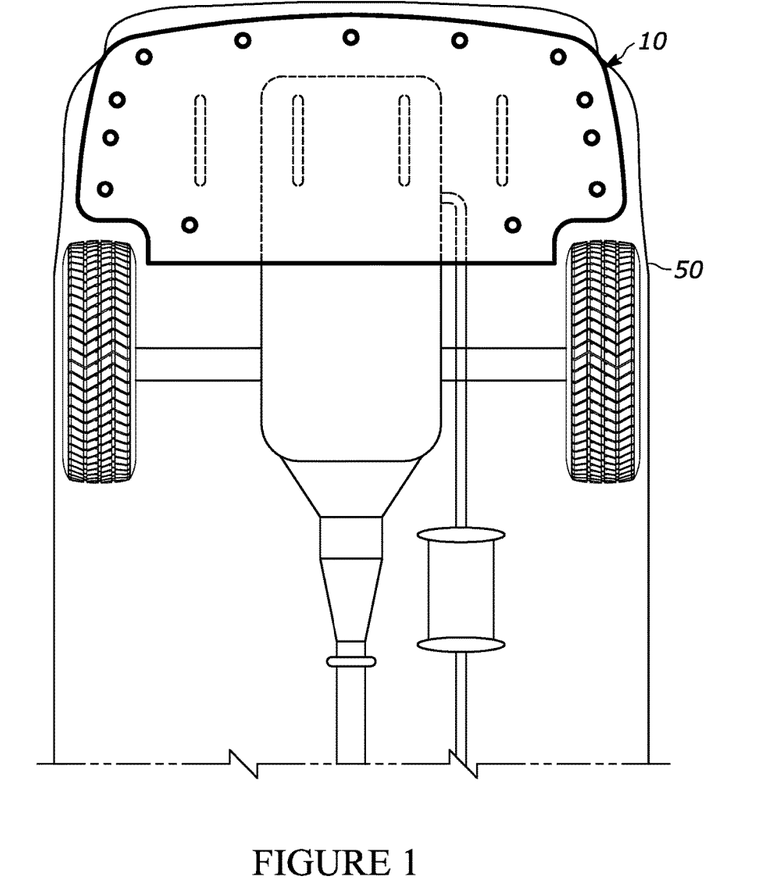
FIG. 1 of the drawings is a bottom plan view of a vehicle having a fascia protection assembly applied thereto.
Figure 3:
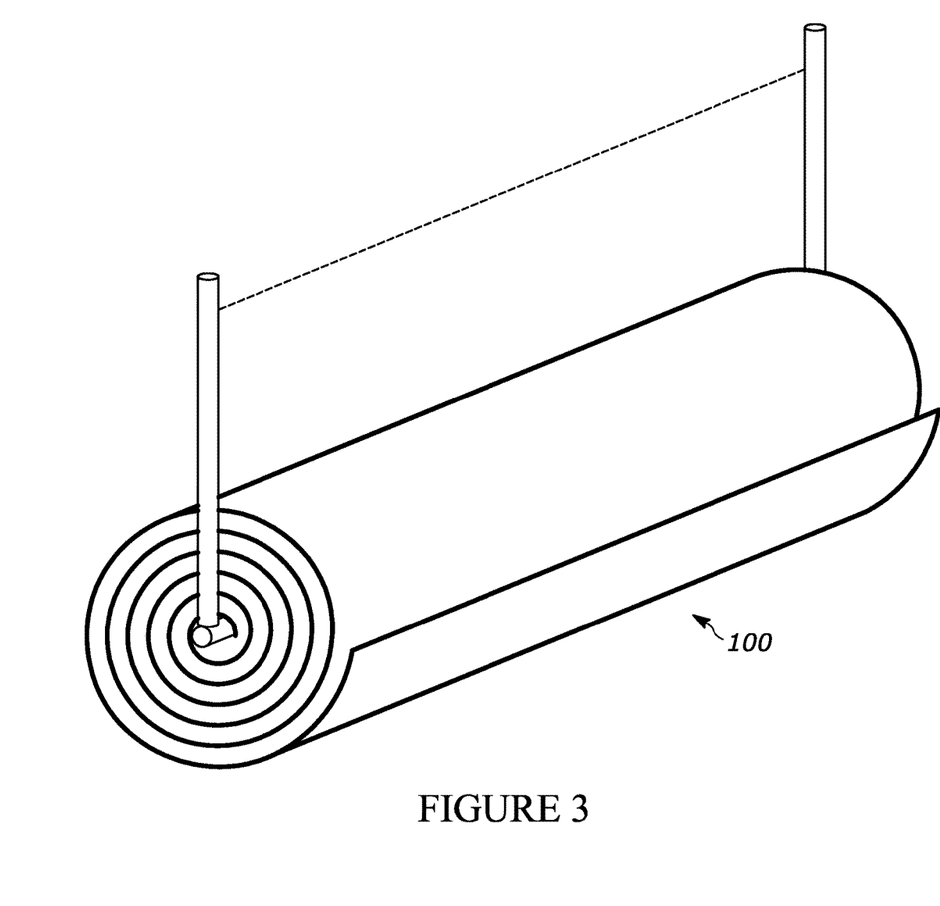
FIG. 3 of the drawings is a perspective view of a roll of fascia protection material from which the fascia protection sheet member of the present disclosure.

Referring now to the drawings and in particular to FIG. 1, the fascia protection assembly is shown generally at 10. The fascia protection assembly is configured to be applied to the bottom of a car to protect the bottom fascia (including any under car protection, bottom of the bumper, etc.) of a vehicle. For example, as is shown in FIG. 1, the fascia protection assembly 10 is configured to be coupled to the underside of vehicle 50, and coupled to components of the vehicle 50, such as the fascia, under body protection, engine components, trim members and the like. As will be explained, the fascia protection assembly 10 can be dispensed from a roll of fascia protection material 100 (FIG. 3).

Figure 2:
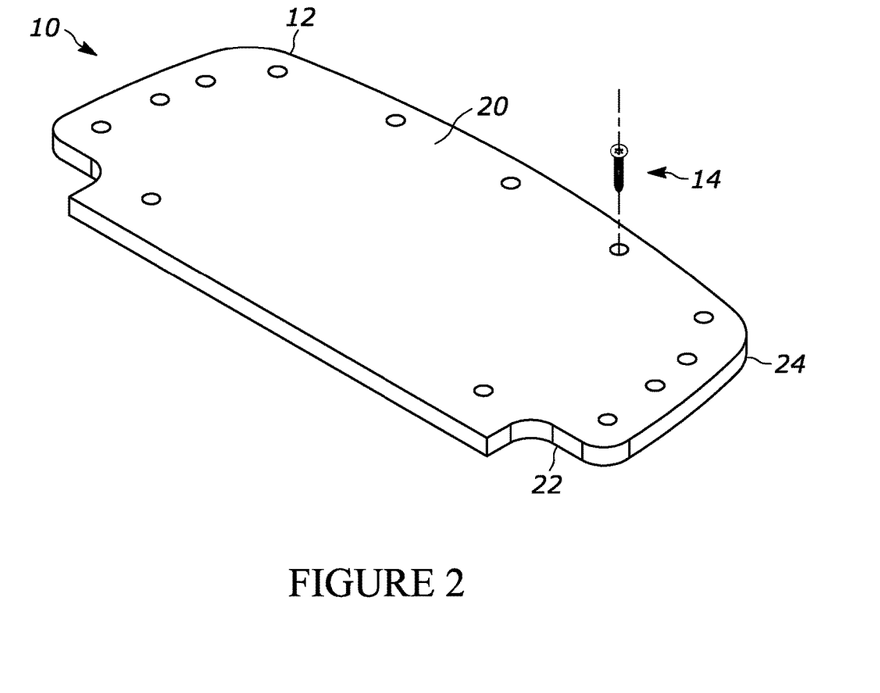
FIG. 2 of the drawings is a perspective view of a fascia protection assembly of the present disclosure.

The fascia protection assembly 10 is shown in greater detail in FIGS. 1 and 2 as including sheet member 12 and fasteners, such as fasteners 14. The sheet member 12 includes a substantially uniform planar sheet member, comprising, for example, a polymer sheet member of an appropriate thickness. Among other materials, it is contemplated that the sheet member 12 comprises a substantially uniform ABS plastic panel having a thickness of between 0.05" and 0.375", while other thicknesses are contemplated (both thinner and thicker). Of course, other materials are likewise contemplated, including, but not limited to other polymeric materials, and composite structures. For example, the materials may comprise other polymer sheeting (or mesh materials), as well as metal materials, and meshes, as well as some pliable metal sheet material. Additionally, the sheet material may have some texture or depth to enhance rigidity and strength.

The sheet member 12, when applied (or prepared for application) onto a vehicle includes inner surface 20, outer surface 22 and outer perimeter 24. In the configuration shown, the inner surface 20 faces the different vehicle components, and may be abuttingly engaged thereto. The outer surface generally faces away from the vehicle. The outer perimeter may define a commonly known geometric configuration, or may be cut and shaped to a particular configuration to fit a particular vehicle (or to fit a particular class or size of vehicle). It is contemplated that pre scored portions, cutting lines or other configurations may be provided on one or both of the inner surface and the outer surface to provide the user with assistance in the shaping and cutting of the structures to the desired configuration for a particular application.

Fasteners, such as fastener 14 comprise a plurality of, in the configuration shown, threaded fasteners that can be extended through openings or holes in the sheet member 12 and threaded into a vehicle structure. In other configurations, other fasteners may be utilized, such as hook and loop fasteners that can be coupled to the different structures, or which may extend through openings in the different structures. In other configurations, fasteners may include tie down straps and structures. In still other configurations, the snaps, rivets, clips and other structures are likewise contemplated for use. Of course, the structure may also be attachable to existing structures and utilize existing fasteners on the vehicle. It is contemplated that the fasteners, where the fasteners comprise threaded screw members, may be of the type that are self-tapping, and/or commonly used plastic body push pins.

In many configurations, the sheet material 12 will be coupled to the front bumper and to an existing lower encapsulating panel. In other instances, the sheet material will be coupled to a bumper and to elements of the body (chassis). In still other configurations, the sheet material may be coupled to a spoiler and to relatively stationary suspension components. In still other configurations, the sheet material may be coupled to only the bumper, for example, with the bumper extending about the front and portions of the side of the vehicle. In still other configurations, the sheet material may be coupled only to the body. In still other configurations, the sheet material may be coupled to addons, such as a frame of a shovel or other attachment. In still other configurations, various combinations of the foregoing are contemplated, as well as other configurations, wherein portions of the underside of the vehicle are at issue.

Figure 5:
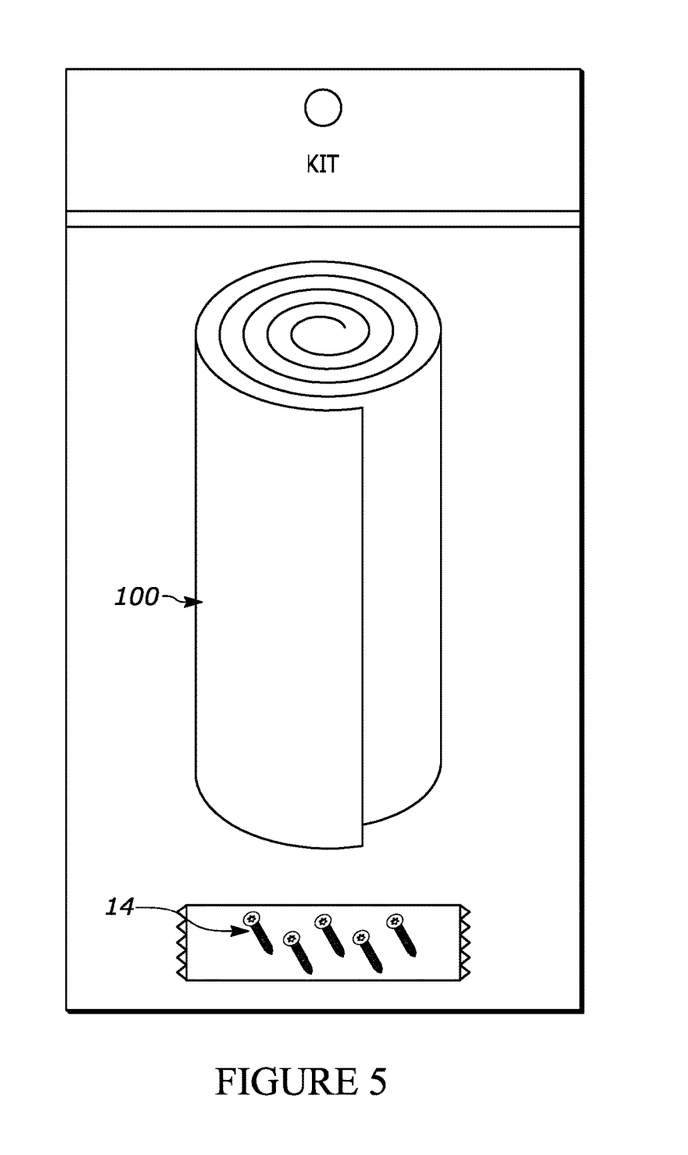
FIG. 5 of the drawings is a schematic representation of a kit having a roll of fascia protection material and a plurality of fasteners provided as a kit.

It is contemplated that the sheet member 12 is sold, as identified above, a roll of fascia protection material 100. The roll may comprise a roll of material that of sufficient width to accommodate a vehicle configuration, and of sufficient length to permit the cutting and application thereof onto a plurality of vehicles. For example, a roll of fascia protection material may be between 12" and 36" in width and, for example 20 to 100 feet in length, rolled upon on a roll of a sufficient diameter. The roll may be mounted to a stand or to a wall fixture, wherein material can be unrolled from the roll and cut therefrom. It is contemplated that the length that is removed from the roll generally defines the distance between the front tires of the vehicle. In other configurations, the roll is of a larger width, wherein the width of the roll comprises the distance between the front tires of the vehicle. It is further contemplated that a shorter and/or narrower roll may be provided with fasteners in a kit or the like, such as shown in FIG. 5.

Figure 4:
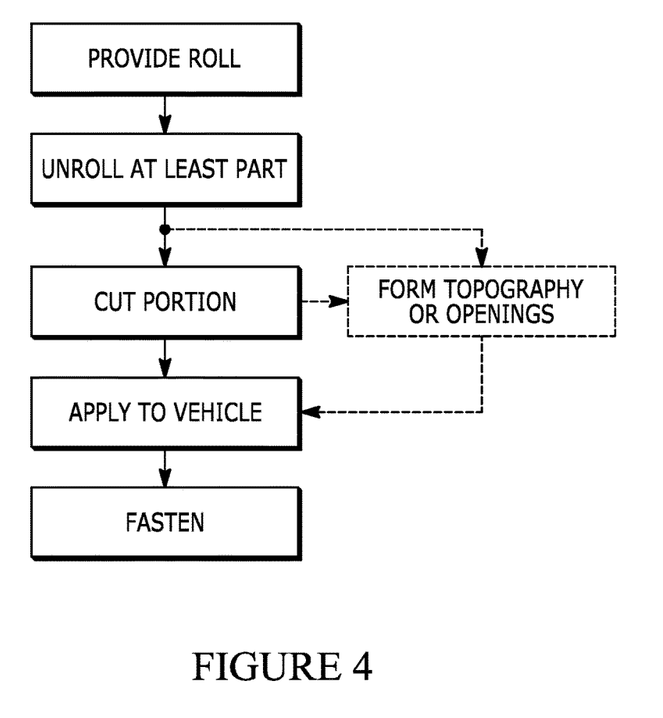
FIG. 4 of the drawings is a flow chart illustrative of the method of forming the facia protection sheet member and applying the same to a vehicle.
Figure 6:
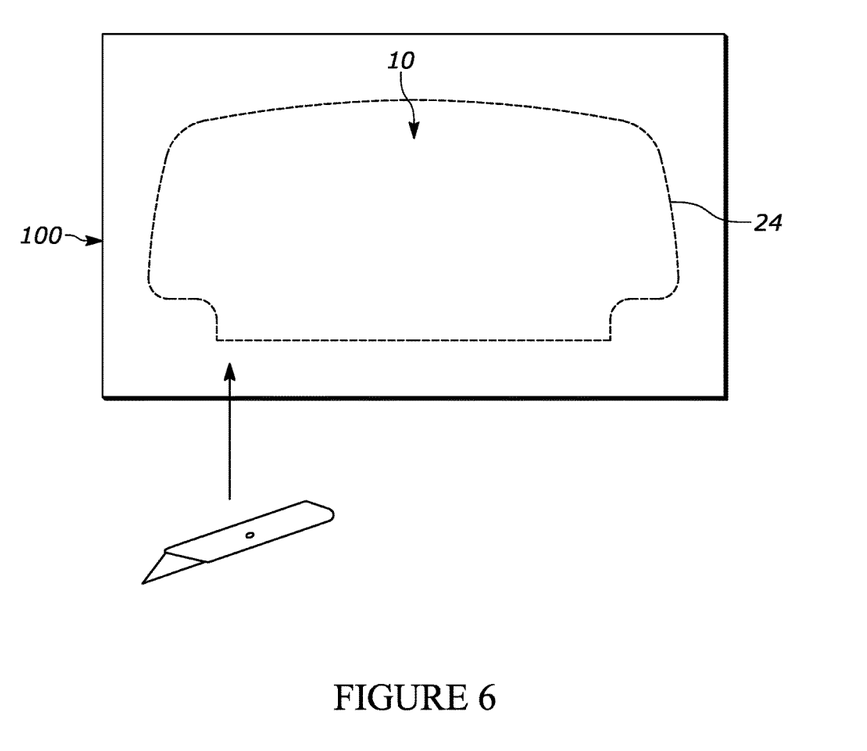
FIG. 6 of the drawings is a schematic representation of the formation of the fascia protection sheet material from a roll of fascia protection material with the aid of a cutting tool.

In either configuration, and with reference to FIG. 4, once the initial cut of material is removed from the roll, additional cutting, trimming and the like can be applied to the portion that has been cut to form the final outer perimeter 24, as is shown in FIG. 6. It is preferred that the material is substantially flexible and can be reformed into a substantially planar material without extensive reforming. In other configurations, it may be necessary to reheat or otherwise manipulate the material into a planar configuration. It is further desirable that the material, while of sufficient thickness, can be easily formed, bent, or directed to follow around or over various structures and protrusions on the underside of a vehicle.

It is further contemplated that through heat and molds, various topographies may be defined into the sheet member, such as, for example, ribs or other structural features which promote rigidity of the panel, and/or provide for certain structures and the like. Furthermore, openings or the like may be provided for purposes of drainage or the like.

It will further be contemplated that the roll may be other than planar, in that the roll may include regularly repeating patterns that may provide a desired topography, or structurally enhancing features to the roll or material. Additionally, a plurality of regularly spaced preformed openings may be provided along the roll of material and to be predefined. Such openings not only provide for the extension of fasteners therethrough, but also provide drainage openings, and openings for the dissipation of heat and fumes from within the engine compartment.

Figure 7:
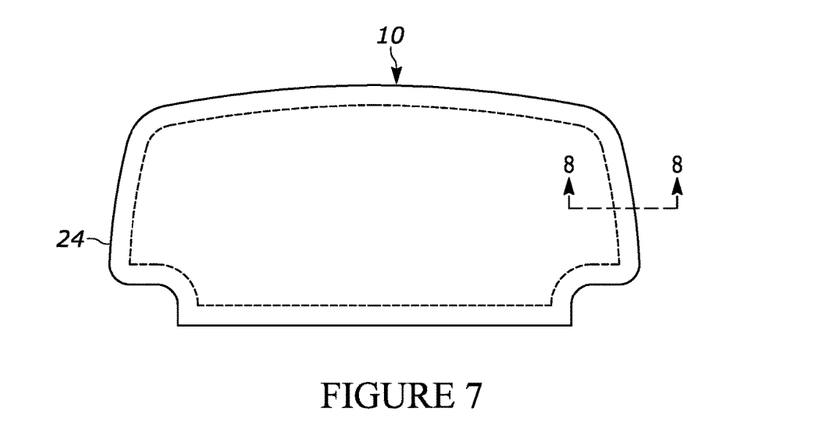
FIG. 7 of the drawings is a top plan view of the fascia protection sheet member having an outer perimeter that is finished.
Figure 8:
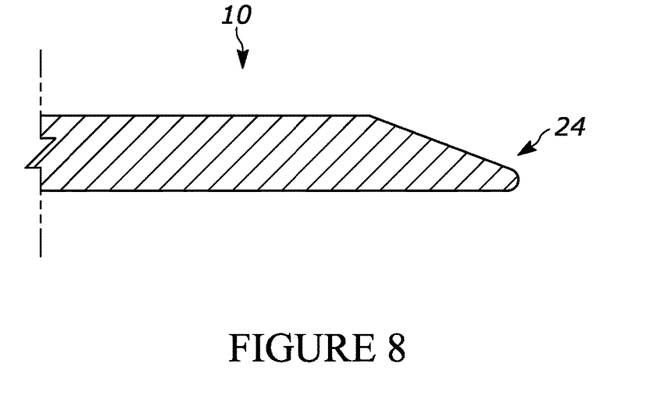
FIG. 8 of the drawings is a cross-sectional view of the finished outer perimeter of a fascia protection sheet member.

With reference to FIGS. 7 and 8, it will further be understood that the outer perimeter may have a secondary application or manipulation applied thereto, such as, for example, a treatment to finish the outer perimeter. For example, a folded over section, a beveled cut or smoothed out finish may be applied to the outer perimeter in a secondary operation. Additionally, an adhesive may be on the sheet material (protected by a release sheet thereover), wherein the sheet material is removed to expose the adhesive prior to application to the vehicle.

In still other configurations, pre-shaped fascia members of a particular length can be rolled one over the next to form a roll of material wherein individual fascia members can be unrolled therefrom.

It is further contemplated that an adhesive may be applied to the roll on the inside surface thereof, with a release sheet being positioned thereover. The adhesive may be applied to the entirety of what becomes the inner layer, or strategically on portions thereof.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method of applying fascia protection onto a vehicle comprising the steps of:
providing a roll of fascia protection material;
unrolling a desired amount of fascia protection material;
cutting the desired amount of fascia protection material from the roll to form a fascia protection sheet member, with the fascia protection sheet member having a perimeter;
applying the fascia protection sheet member onto a vehicle;
attaching the fascia protection sheet member to the vehicle; and
applying a finish to the perimeter of the fascia protection sheet member.

2. The method according to claim 1 wherein the fascia protection sheet member is further trimmed after being cut from the roll.

3. The method according to claim 1 wherein the roll of fascia protection material comprises a polymer material.

4. The method according to claim 3 wherein the polymer material comprises an ABS plastic.

5. The method according to claim 3 wherein the roll of fascia protection material comprises a roll that has a length of between 20 feet and 100 feet.

6. The method according to claim 5 wherein the roll of fascia protection material comprises a roll that has a thickness of between 0.05" and 0.375".

7. The method according to claim 5 wherein the roll of fascia protection material comprises a roll that has a width of between 12" and 36".

8. The method according to claim 1 wherein the step of applying further comprises one of the steps of:
bevel cutting the outer perimeter;
smoothing out the outer perimeter; and
folding the outer perimeter over itself.

9. The method according to claim 1 wherein the fascia protection sheet member further includes at least one of a topography that is other than planar, a plurality of strengthening ribs and a plurality of openings therethrough, and the method may comprise the step of forming one of a topography feature and an opening after or before the step of cutting.

10. The method according to claim 1 wherein the step of attaching further comprises the step of applying a plurality of fasteners to the vehicle and to the fascia protection sheet member to attach one to the other.

11. The method according to claim 1 wherein the step of attaching further comprises the step of directing a threaded fastener through the fascia protection sheet member and into the vehicle to capture the fascia protection member between the fastener and the vehicle.

12. The method according to claim 11 wherein the threaded fastener comprises a self tapping screw.

13. The method according to claim 11 wherein the step of attaching further comprises the step of directing a plurality of threaded fasteners through the fascia protection sheet member, at least a plurality of the plurality of threaded fasteners positioned about the perimeter.

14. A fascia protection assembly comprising:
a sheet member having an inner surface, an outer surface and a perimeter, the sheet member being rolled up into a roll of fascia material, wherein the sheet material is larger than is necessary for application onto a vehicle;
a plurality of fasteners structurally configured for coupling the sheet member to the vehicle; and
a finish applied to the perimeter of the sheet member.

15. The fascia protection assembly of claim 14 wherein the sheet material has a plurality of openings formed therethrough, structurally configured to receive a plurality of fasteners therethrough.

16. The fascia protection assembly of claim 15 wherein the plurality of fasteners comprises threaded fasteners.

17. The fascia protection assembly of claim 14 wherein the perimeter is formed by cutting at least a portion of the roll of fascia material.

18. The fascia protection assembly of claim 14 wherein the sheet member and the plurality of fasteners are provided as a kit.

\* \* \* \* \*